No. 853,487. PATENTED MAY 14, 1907.
W. L. TUTTLE.
VALVE OPERATING MECHANISM FOR AUTOMATIC AIR AND GAS MIXERS.
APPLICATION FILED NOV. 7, 1905.

2 SHEETS—SHEET 1.

No. 853,487. PATENTED MAY 14, 1907.
W. L. TUTTLE.
VALVE OPERATING MECHANISM FOR AUTOMATIC AIR AND GAS MIXERS.
APPLICATION FILED NOV. 7, 1905.

2 SHEETS—SHEET 2.

UNITED STATES PATENT OFFICE.

WILLIAM L. TUTTLE, OF MARENGO, IOWA.

VALVE-OPERATING MECHANISM FOR AUTOMATIC AIR AND GAS MIXERS.

No. 853,487.        Specification of Letters Patent.        Patented May 14, 1907.

Application filed November 7, 1905. Serial No. 286,290.

*To all whom it may concern:*

Be it known that I, WILLIAM L. TUTTLE, a citizen of the United States, residing at Marengo, in the county of Iowa and State of Iowa, have invented certain new and useful Improvements in Valve-Operating Mechanism for Automatic Air and Gas Mixers, of which the following is a specification.

My invention relates to mechanism for operating the valves in automatic air and gas mixing machines and has for its object the provision of mechanism by which the position of the gasometer bell controls the opening and closing of the valve controlling the flow of the vapor or gas to the gasometer.

My invention will be described in detail hereinafter and illustrated in the accompanying drawings in which—

Figure 1:
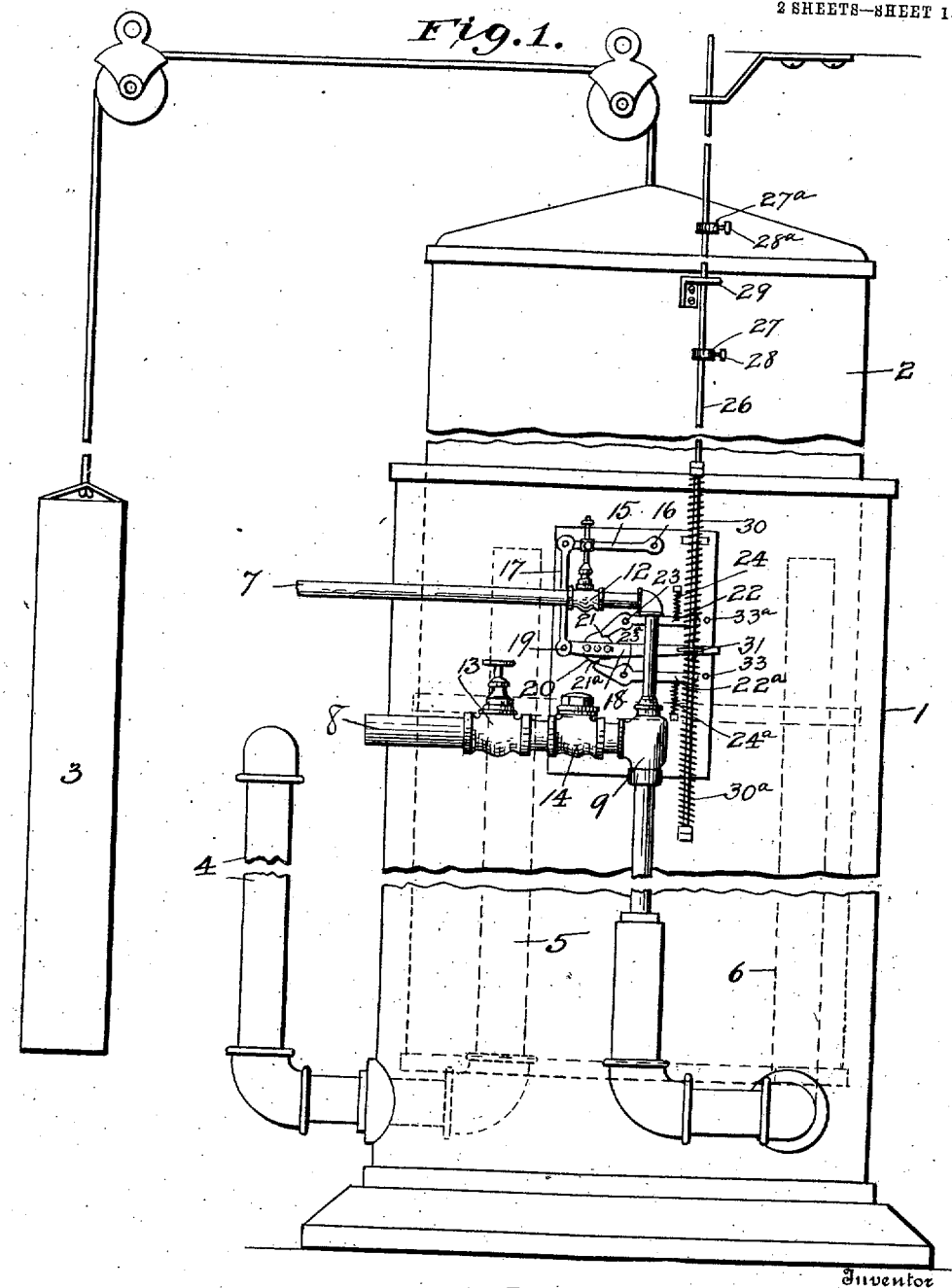
Figures 2, 3:
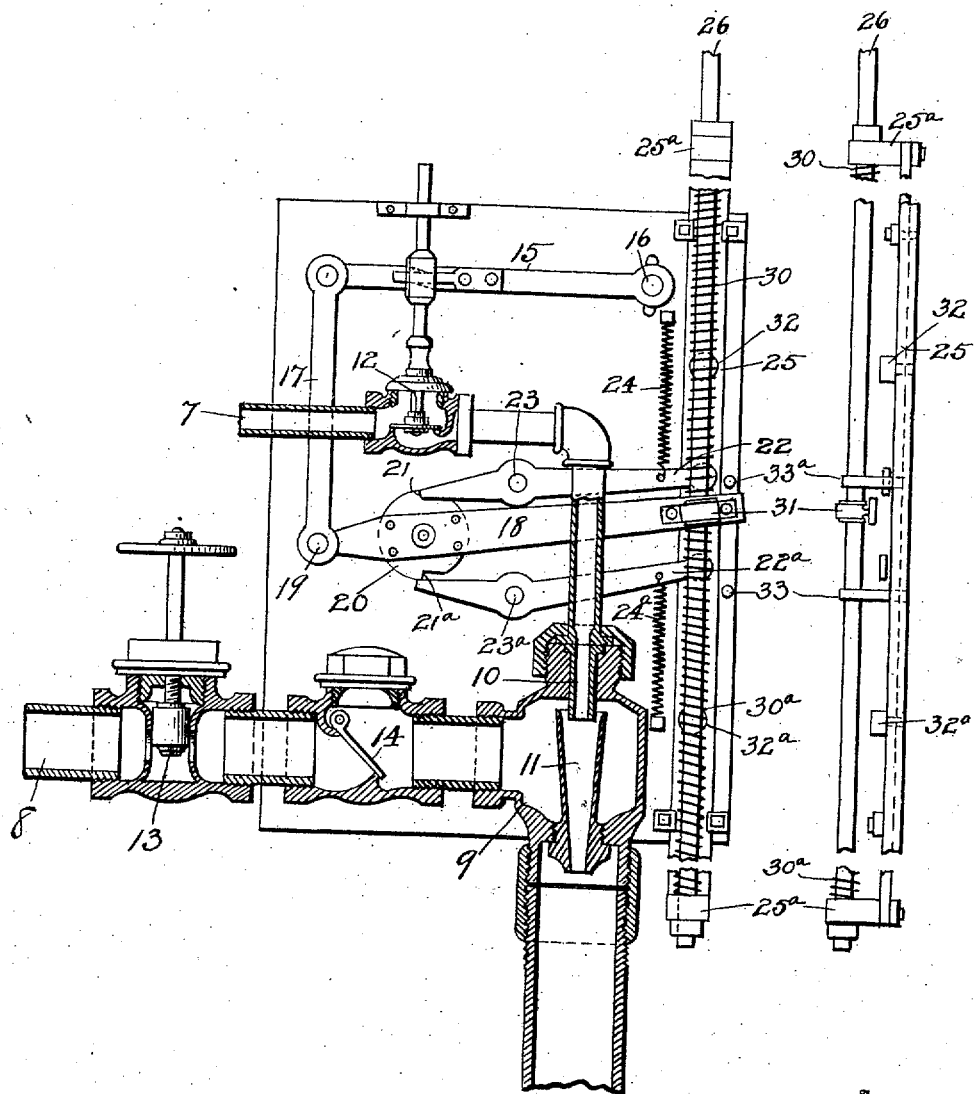

Figure 1 is a view of a gasometer having my automatic mixer attached thereto, Fig. 2, an enlarged detailed view of the valve mechanism for controlling the mixture of the gas and air, and Fig. 3, a side view of the mechanism illustrated in Fig. 2.

In the drawings similar reference characters indicate corresponding parts throughout the several views.

1 represents the stationary part of a gasometer and 2 the movable bell having a balance weight 3 secured to its top which may be increased or diminished to regulate the pressure of the gas in the service pipes 4, 5 representing the outlet pipe connected with the service pipes.

6 represents the inlet pipe for filling the gasometer and 7 the vapor or gas inlet pipe connected with said inlet pipe 6 and 8 an air inlet pipe connected with a mixing chamber at the opening to said inlet pipe 6, the vapor pipe 7 ending with a nozzle 10 emptying into a cone-shaped sleeve 11 in the mixing chamber 9, this construction forming an injector which serves to draw the air into the sleeve 11 where it mingles with and is intimately mixed with the vapor or gas pouring from nozzle 10. 12 represents a valve in gas inlet pipe 7, 13 a regulator valve in air inlet pipe 8 and 14 a clack valve controlled by the suction in the mixing chamber 9.

The flow of vapor or gas is regulated by means of valve 12 the stem of which is operatively connected with lever 15 fulcrumed at 16 and having secured thereto an arm 17 with its other end secured to another lever 18 fulcrumed at 19. A disk 20 is rigidly secured to lever 18 having notches 21 and 21$^a$ in its periphery in which seat lever pawls 22 and 22$^a$ respectively.

24 and 24$^a$ represent coil springs to normally hold the ends of pawls 22 and 22$^a$ in engagement with notches 21 and 21$^a$. It will be understood from this description of the drawings that when the free end of lever 18 is above the horizontal plane through its fulcrum that the lever 15 is drawn down so as to close valve 12 and at the same time the pawl 22 engages notch 21 and prevents the lever 18 being moved to open the valve. When the end of the lever is below the horizontal plane of the fulcrum 19 the valve 12 is open and the end of lever pawl 22$^a$ being in engagement with notch 21$^a$ prevents movement of the lever to close the valve.

25 represents a bar slidably mounted and having secured to the ends thereof lugs 25$^a$ to which are secured a rod 26 that extends upwardly and ends above the highest point of movable bell 2.

27 and 27$^a$ represent collars movably secured to rod 26 by means of set screws 28 and 28$^a$ while 29 represents an arm on movable bell 2 having a hole therein to receive rod 26, said arm riding on rod 26 and adapted to engage collars 27 and 27$^a$ to regulate the operation of the levers 18, 22 and 22$^a$ as will be more fully explained hereinafter.

30 represents a coil spring mounted on rod 26 between lug 25$^a$ at the upper end of bar 25 and lug 31 on the free end of lever 18 and 30$^a$ another coil spring mounted between lug 31 and lug 25$^a$ at the lower end of bar 25.

32 represents a lug on the upper portion of bar 25 and adapted to engage the free end of lever pawl 22 and 32$^a$ a lug on the lower end of bar 25 and adapted to engage lever-pawl 22$^a$.

33 and 33$^a$ represent pins to limit the movement of lever 18 either up or down.

The operation of my valve actuating means is as follows. Assuming that the parts are in the position shown in the drawings the feed of vapor and air to the gasometer is shut off while the consumption of gas through the service pipes 4 reduces the pressure in the gasometer thus permitting the bell 2 to lower by its own weight. When the arm strikes collar 27 it presses rod 26 down thus pressing bar 25 downward and compressing the spring 30 between lug 25$^a$ on the upper end of bar 25 and lug 31 on lever 18. The lever 18 is, however, prevented from movement under the influence of spring 30 because held by means of lever-pawl 22 seated in notch 21 in disk 20 secured to said lever. A continuation of the downward movement of rod 26 and bar 25 finally brings lug 32 into engagement with the free end of lever-pawl 22 thus disengaging it from the notch 21 and freeing lever 18 to the action of spring 30 which depresses the free end of said lever 18 and raises the free end of lever 15 thus opening valve 12 and permitting the flow of vapor or gas to the gasometer, being mixed with air as above-described. When the lever 18 is swung downwardly as above-described it comes to rest on pin 33 the end of lever pawl 22$^a$ engages notch 21$^a$ and the feed of gas and air to the gasometer continues until the bell 2 is raised sufficiently to cause lug 29 to engage collar 27$^a$ when a reversal of the action of the rod 26 and bar 25 causes the spring 30$^a$ to press upward on the end of lever 18. Lever 18 is, however, prevented from moving by the lever-pawl 22$^a$ which is seated in notch 21$^a$ in disk 20 until lug 32$^a$ engages the free end of said pawl 22$^a$ when it will be moved from engagement with said notch 21$^a$ and the lever 18 is freed to move actuated by the spring 30$^a$ thus closing the valve 12. It will be understood that this operation is entirely automatic and repeated indefinitely, the purpose of the construction of the valve operating means as above described being to prevent the valve 12 from being partly opened so as to admit just sufficient vapor or gas to counteract the amount exhausted from the gasometer through the service pipes 4, which flow would have insufficient force to cause the mixture of the proper amount of air.

Having thus described my invention what I claim is—

1. A valve operating device comprising a lever, a notched disk secured to said lever, pawls to engage the notches in said disk, a bar slidably mounted and having lugs to engage said pawls to release them from engagement with said notches, and means secured to said bar to actuate said lever, substantially as shown and described.

2. A valve operating device comprising a lever, a notched disk secured to said lever, pawls to engage the notches in said disk, a bar slidably mounted and having lugs to engage said pawls to release them from engagement with said notches, and springs secured to said bar and bearing against said lever to actuate it, substantially as shown and described.

3. A valve operating device comprising a lever, a notched disk secured to said lever, pawls to engage said notches, a bar slidably mounted and having lugs thereon to engage said pawls to release them from engagement with said notches, a rod secured to said bar, the end of the lever slidably mounted on said rod, and a spring bearing against each side of the lever and surrounding the rod and secured thereto, substantially as shown and described.

4. A valve operating device comprising a lever, a notched disk secured to said lever, pawls to engage said notches, a bar slidably mounted and having lugs thereon to engage said pawls to release them from engagement with said notches, a rod secured to said bar, the end of the lever slidably mounted on said rod, a spring bearing against each side of the lever and surrounding the rod and secured thereto, collars adjustably secured to said rod, and a reciprocating mechanism to engage said collars to actuate the rod, substantially as shown and described.

In testimony whereof I hereto affix my signature in the presence of two witnesses.

WILLIAM L. TUTTLE.

Witnesses:
M. T. BEEM,
C. M. BEEM.